United States Patent

Berkley et al.

[15] 3,699,271

[45] Oct. 17, 1972

[54] SPEECH PROCESSOR USING MULTIBAND CONTROLLED CENTER CLIPPING

[72] Inventors: David Arthur Berkley, Red Bank; Olga Mary Mracek Mitchell, Summit; John Robinson Pierce, Warren, all of N.J.

[73] Assignee: Bell Telephone Laboratories, Incorporated, Murray Hill, N.J.

[22] Filed: Nov. 16, 1970

[21] Appl. No.: 89,633

[52] U.S. Cl...............................179/170.8, 179/170.6
[51] Int. Cl...............................................H04b 3/24
[58] Field of Search.............179/170.2, 170.6, 170.8

[56] References Cited

UNITED STATES PATENTS 3,567,873 3/1971 Peroni....................179/170.2
3,585,311 6/1971 Berkley et al...........179/170.2
3,588,385 6/1971 Moye.......................179/170.2
3,370,294 2/1968 Kahn.......................179/170.6
3,500,000 3/1970 Kelly et al...............179/170.2

*Primary Examiner*—Kathleen H. Claffy
*Assistant Examiner*—William A. Helvestine
*Attorney*—R. J. Guenther and Edwin B. Cave

[57] ABSTRACT

An echo suppressor for full duplex telephone circuits consists of a filter bank of contiguous band filters in the transmission path, with each filter output feeding a separate center clipper. Each clipping level is controlled by echo signal amplitude as attenuated by the trans-hybrid loss that occurs in the corresponding subband. The scheme permits "double-talking" while suppressing the echo component.

6 Claims, 12 Drawing Figures

INVENTORS
D. A. BERKLEY
O. M. M. MITCHELL
J. R. PIERCE
BY Charles E. Graves
ATTORNEY

SPEECH PROCESSOR USING MULTIBAND CONTROLLED CENTER CLIPPING

FIELD OF THE INVENTION

This invention relates in general to long-distance telephony; and more particularly to the reduction of echoes in such circuits.

BACKGROUND OF THE INVENTION

In telephony, use of both two-wire and four-wire modes for connecting distant-calling stations gives rise to the well-known problem of circuit echo. The source of most echoes are imperfectly balanced hybrid circuits at the two- to four-wire junctures.

Circuit echo is normally not detected by a subscriber if the circuit is short-distance. In this case, the echo signal cannot readily be discerned because it is almost coincident in time with the listener's side-tone level. As the two-way path becomes longer, however, the delay increases until the echo can be heard quite distinctly even when greatly attenuated. The problem is particularly present in circuits which includes a communication satellite, where the round-trip delay is nearly 0.6 second. A communications circuit with two satellite links would, of course, have double this delay.

Accordingly, echo suppressors are routinely used in telephone transmission paths where circuit echo can be expected. Presently, the type of echo suppressor most widely used is a voice switch that recognizes the presence of speech in, say, the incoming direction, and in response inserts a large loss in the outgoing direction. This greatly attenuates any echo signal that may leak across the hybrid but at the same time attenuates speech signals transmitted in the outgoing direction. Consequently a break-in mode is provided that permits the receiving party to override a stream of incoming speech. However, break-in is sometimes difficult to achieve. In the break-in process, moreover, speech is sometimes mutilated; and during break-in, echo may be present.

One scheme for eliminating echo without impeding the free flow of conversation in both directions is disclosed in M. M. Sondhi U.S. Pat. No. 3,499,999 assigned to applicant's assignee. Here, signals incoming to a hybrid are supplied to a plurality of filter networks adjusted to develop a set of impulse responses. A linear combination of these responses approximates the typical echo impulse response. These linear transformations of the input signal are selectively adjusted in gain by a differential outgoing signal. This signal then is subtracted from signals in the outgoing circuit to render it relatively echo-free. A more generalized scheme practiced in accordance with the foregoing is disclosed in U.S. Pat. No. 3,500,000 of J. L. Kelly, Jr. et al. assigned to applicant's assignee. Both approaches enable double-talking to take place while the echo is being canceled.

An alternative to these schemes is disclosed in the U.S. Pat. No. 3,585,311 of D. A. Berkley and O. M. M. Mitchell. That invention contemplates dividing the bandwidth of the voice-frequency channel into several contiguous subbands by passing the incoming signal through a bank of bandpass filters. The output of each filter is then center-clipped. Clipping distortion is removed by filtering the clipped signals in a second set of filters and combining their outputs for transmission. The clipping levels are fixed to close down each passband a large fraction of the time, assuring suppression of the relatively weaker (by 6 dB to 30 dB) power of the echo signals. Mentioned also were parameter-responsive clipping levels.

The present invention is directed to parameter-responsive clipping levels in the processor of U.S. Pat. No. 3,585,311.

The principal inventive object is to operate upon an echo signal present in a transmission path in such a way as to remove the echo signal and to leave unaffected those portions of the transmission path bandwidth that are relatively low in echo signal energy content.

A broad object of the invention is to permit a double-talk to occur in a long-distance telephone circuit, while at the same time reducing or masking the echo signals.

A related inventive object is to eliminate the need for monitoring equipment to detect occurrence of double-talk.

A further object of the invention is to avoid mutilation of speech attendant the suppression of echo during a double-talk situation on a long-distance telephone circuit.

SUMMARY OF THE INVENTION

Pursuant to the invention, the clipping levels in each subband of the echo suppressor described in U.S. Pat. No. 3,585,311, are automatically adjusted in accordance with the level of echo signal present in that band.

Advantageously, this is achieved by feeding the incoming signal into a control filter bank made up of the same contiguous subbands as the input filter bank. In one such embodiment, the attenuation in each subband of the control filter bank is adjusted to the trans-hybrid loss that occurs across the hybrid in that subband. In this manner, signals are generated that are identical to the filtered echo signal. The output of each subband of the control filter bank is peak-detected. Each peak represents a control signal for continuously resetting the clipping level in the corresponding center clipper so as to just remove the echo signal in that particular band.

A given clipping level advantageously is held for a specified short time before being permitted to drop. Circuit echo if present thus is removed.

One feature of the present invention is an echo suppressor which requires no decision between a single- and a double-talking mode.

A further feature of the invention is the substantial elimination or masking of echo during double-talking.

The invention and its further features, objects, and advantages will be readily apprehended from a reading of the detailed description to follow of an illustrative embodiment thereof.

DETAILED DESCRIPTION OF ILLUSTRATIVE EMBODIMENTS

Figure 1:
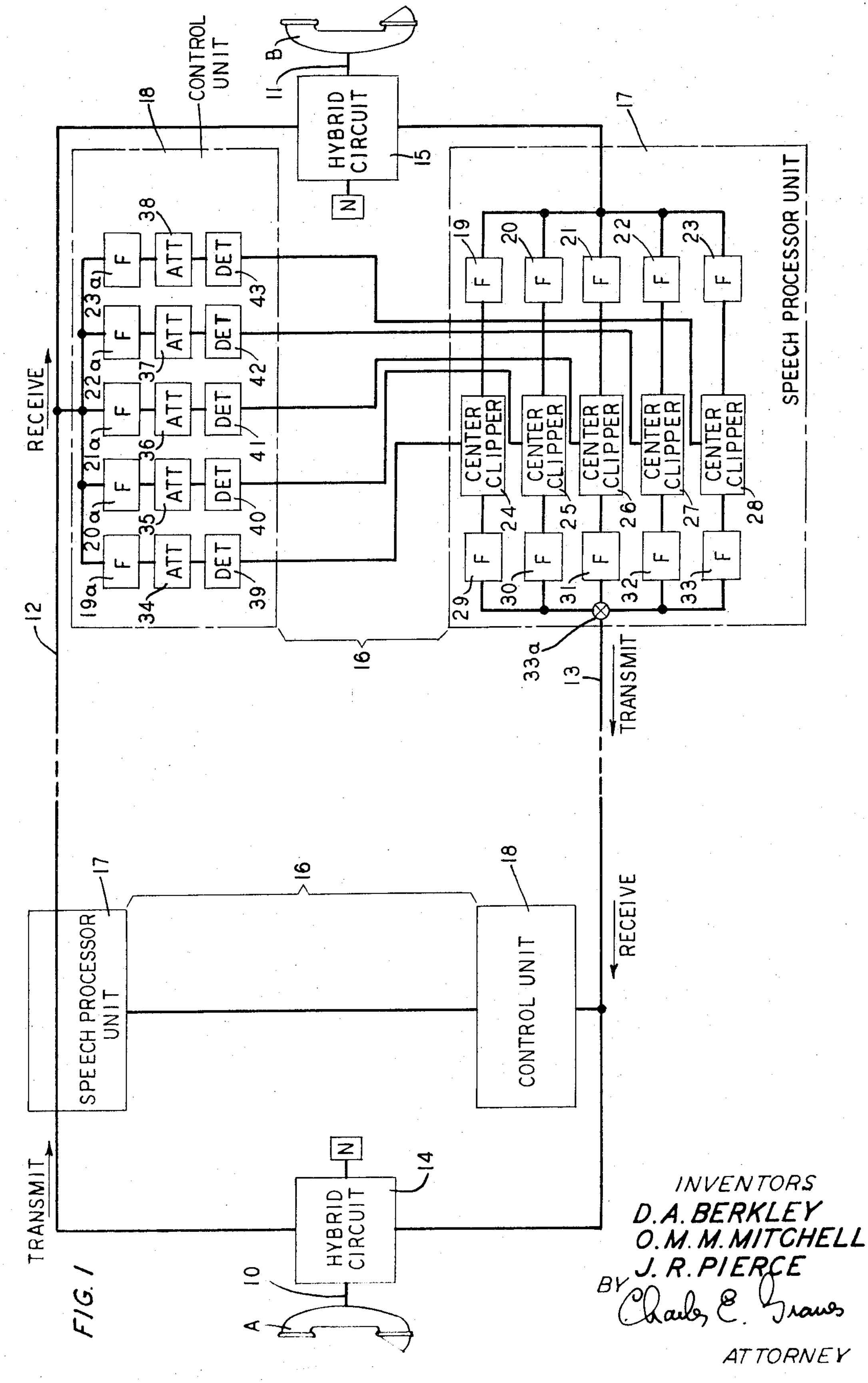
FIG. 1 is a schematic block diagram depicting the invention connected in a two-way telephone circuit containing hybrids.

FIG. 1 depicts the invention as used in the suppression of echo in a long-distance telephony circuit. Two telephone stations denoted by handsets A and B are connected by two-wire links 10, 11 into a duplex network consisting of A-to-B transmission path 12, and B-to-A transmission path 13. The paths 12, 13 are simply noncoincident, and might constitute different RF bands of a wideband radio channel using multiplexing equipment, or different physical entities such as a microwave radio path or a coaxial cable link. The conversion from two-wire to four-wire occurs at station A through hybrid circuit 14; and at station B through hybrid circuit 15.

The echo suppressor of the present invention, designated 16, consists of a speech processor unit 17 and an echo signal-responsive control unit 18. Advantageously, two such suppressors 16 are used, one for each of the hybrid circuits 14, 15. Speech processor 17, is substantially that described in the prior U.S. Pat. No. 3,585,311 of Berkley et al. It consists of a plurality of contiguous band input filters disposed in the transmission path 13; in this embodiment, the five filters denoted 19–23. The output of filters 19–23 are fed respectively to center clippers 24–28, provision being made if necessary to assure that the outputs arrive at the center clippers 24–28 at substantially the same time.

Figure 2A:
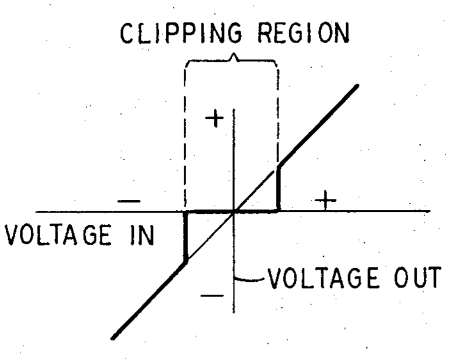
FIGS. 2A and 2B are transfer function plots for clipping characteristics.
Figure 2B:
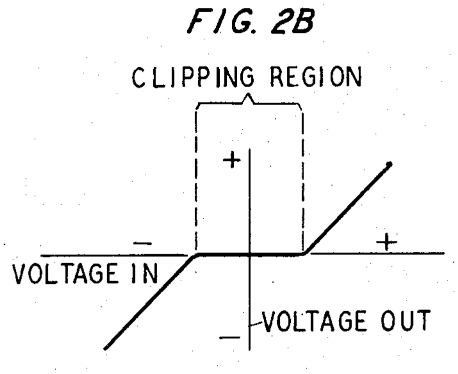
Figure 3A:
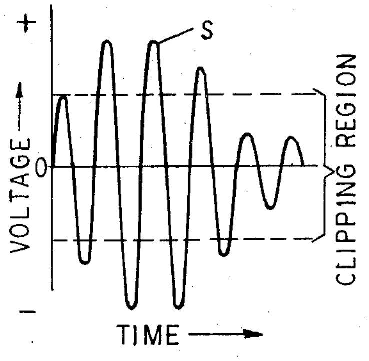
FIGS. 3A, 3B, and 3C are graphical portrayals of unclipped and clipped signals.
Figure 3B:
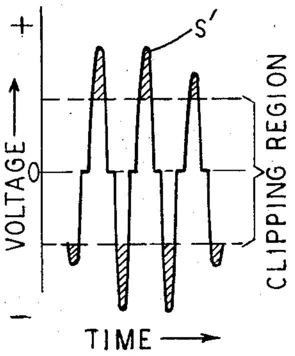
Figure 3C:
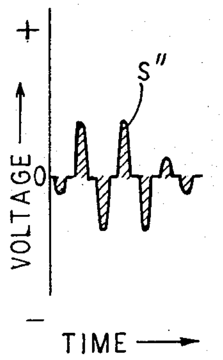

The center clippers 24–28 are designed with a variable transfer function, two examples of which are shown instantaneously in FIGS. 2A and 2B. The transfer function of FIG. 2A provides no voltage output for voltage inputs which fall instantaneously within the clipping region. Input voltage amplitudes outside of the echo-clipping region are not attenuated. The transfer function of FIG. 2A has the same clipping region, but also has the effect of reducing the output voltage amplitude. These effects are further illustrated in FIGS. 3A, 3B, and 3C. An input signal S of FIG. 3A when processed by the transfer function of FIG. 2A results in the clipped signal S' of FIG. 3B. The signal S when processed by the transfer function of FIG. 2B results in the clipped signal S'' depicted in FIG. 3C.

In selecting an appropriate transfer function to characterize the center clippers 24–28, it should be borne in mind that the transfer function of FIG. 2A will exhibit less distortion, and is more efficient, than that of FIG. 2B.

As also taught in the aforementioned U.S. Pat. No. 3,585,311, the respective outputs of the center clippers 24–28 may be fed to a second series of filters 29–33 whose function is to remove distortion products generated in the center clippers 34–38. During single-talking, however, the entire echo is successfully removed by the inventive process being described; no significant distortion products are generated. Hence for single-talking the filters 29–33 are not necessary. Even during double-talking, the filters 29–33 may not be necessary since the distortion products are partially masked. Nevertheless, the output filters 29–33 when used, have passbands identical to the counterpart input filters 19–23. The output of filters 29–33, or of center clippers 24–28 are combined in a summing junction 33*a*.

Because of imperfect impedance matching within the hybrid 15, part of the signal received at station B from the far-end talker to station A, feeds through the hybrid 15 and into the transmission path 13. The so-called return loss of hybrid such as 15 is typically 12 dB; that is, the echo level is 12 dB below the normal transmit signal level generated by the near-end talker at station B. As taught in the aforementioned U.S. Pat. No. 3,585,311, by setting the clipping levels in processor 17 permanently at, for example, one-quarter of the anticipated average peak amplitude in the respective bands, the echo signal is removed from the transmit path 13.

Pursuant to the present invention, clipping levels in the processor 17 are variable for each clipper 24–28, in accordance with the amount of circuit-echo energy instantaneously present in the particular subband of the clippers' corresponding input filters 19–23.

To this end, a part of the received signal present on transmit path 12 is shunted to a plurality of control filters designated 19*a*–*23a* which have contiguous passbands corresponding in bandwidth to those of the filters 19–23. The output of each control filter 19*a*–*23a* is attenuated in amplitude by fixed attenuators 34–38 respectively. This attenuation reduces the power level of the signal in the respective bands of filters 19*a*–*23a* to a level that would be expected to exist in the same subbands after the received signal undergoes a trans-hybrid loss through hybrid 15. In other words, the attenuation in each band is set to correspond to a predetermined and assumed constant worst-case trans-hybrid loss in that band so that control signals identical in shape and amplitude to the filtered echo signal emitting from filters 19–23 are obtained.

Figure 4:
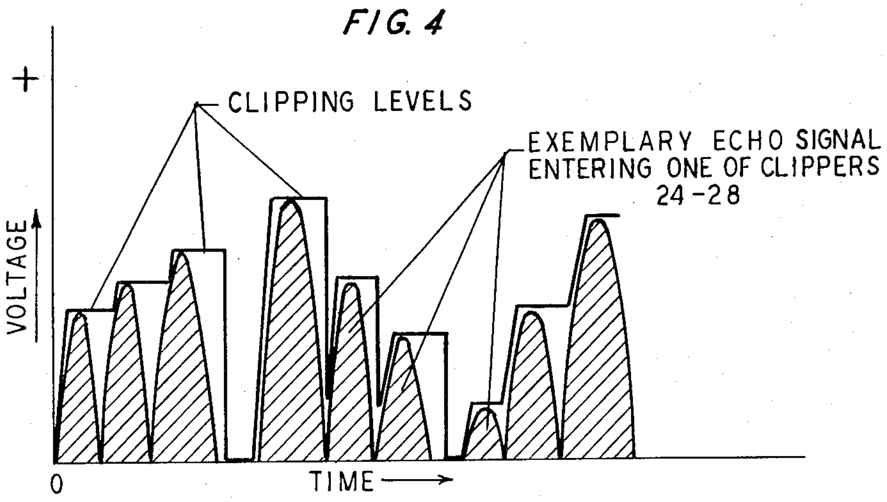
FIG. 4 depicts graphically a varying clipping level operating on an echo signal.

Pursuant to the invention, the attenuated outputs of control filters 19*a*–*23a* are fed respectively to peak detectors 39–43 which also perform the function of rectifying the received input signals. For peak detection, the detectors 39–43 are advantageously designed with the characteristic described in FIG. 4. There, representative rectified echo signals are schematically depicted as having different peak amplitudes as well as occasional gaps in time. In the absence of any signal, the detectors 39–43 generate no output; and the clipping levels in clippers 24–28 remain at zero, that is, no clipping occurs. On sensing a signal, each peak detector 39–43 generates an output that increases with a rise-time comparable to the speech bandwidth present. Thus, the control signal generated in detector 39, on being fed to the corresponding subband center clipper 24 of processor 17, causes the clipping level there to be at all times at least as high as necessary to prevent passage of the echo signal then present in that subband. As an alternative, the clipping levels instead of returning to zero may be adapted to return to a fixed minimum value. This is useful where, for example, it is desired to also reduce any reverberative signals that may be present.

As the instantaneous echo signal commences to subside, the detectors 39–43 briefly hold the clipping level at the most recent control signal peak obtained. The hold-time should be greater than the echo end-delay, which may be up to 25 ms. Thereafter, the clipping level drops to zero pursuant to the invention. A similar process of clipping level control is provided to the center clippers 25–28 by the respective detectors 40–43.

Advantageously, for the four lowest-frequency filters such as 19, 20, 21, 22, 1-octave filters with 250, 500, 1,000, 2,000 Hz center frequencies respectively may be used. A ⅓ octave filter with a center frequency of 3,150 Hz may advantageously be used at the top of the frequency band to complete the five-channel system. A six-channel system or a four-channel system may also be contemplated. The five-channel system is likely to exhibit less phase and delay distortion than the six-channel system because of the wider band filters used.

One distinct advantage of the echo suppressor of the present invention is that it requires no decision to distinguish between single-talking and double-talking conditions. In single-talking from the far end (where a person at station A is transmitting and is being received by a person at station B who is silent), the clipping levels are set with a rise-time faster than any speech component, so as to just remove the echo in each subband. When the received signal ceases, the clipping level falls to zero after a holding-time that is set to be greater than the end-delay.

In single-talking from the near-end (the person at station B is transmitting while station A receives and is silent), the clipping levels at station B are zero since presumably the suppressor 16 at hybrid 14 has suppressed any echo from station B in the path 12 and therefore there is no received echo signal at station B.

In a double-talking situation, that is, where both A and B are talking at the same time, the clipping levels in both suppressors 16 still seek to follow the echo signals. Echo energy is still eliminated in those subbands where the echo of the distant talker and the locally generated transmitted signal do not overlap. In addition, echo is eliminated during gaps between the words and sentences of the near-end speaker in the same way as for single-talking from the far end.

However, when energy from echo signal as well as from transmitted signal are both present in any subband, they are added together and clipping can no longer remove the echo signal. It has been found, however, that even in this case the echo is not noticeable probably because of masking of the echo by the received signal. To optimize the above factors, it is frequently advantageous to design the bandwidths of the filters 19–23 to be as narrow as possible. Hence, a minimum number of channels may be determined by the effectiveness in echo suppression as well as by the avoidance of harmonic distortion problems referred-to in the aforementioned U.S. Pat. No. 3,585,311.

As mentioned, trans-hybrid losses typically are in the vicinity of 12 dB; but may be significantly more or less in given cases. If the return loss is sufficiently high, as, for example, if echo is first reduced using an echo canceler of the type referred-to in U.S. Pat. Nos. 3,499,999 and 3,500,000,a worst-case constant setting of the attenuators of the present invention can be made. Experience has shown that for an effective return loss of ≥ 25 dB, this combination results in a connection indistinguishable in quality from a four-wire circuit. For an echo suppressor of the type herein-described to be effective in other cases, variations in return loss must be taken into account.

Figure 5:
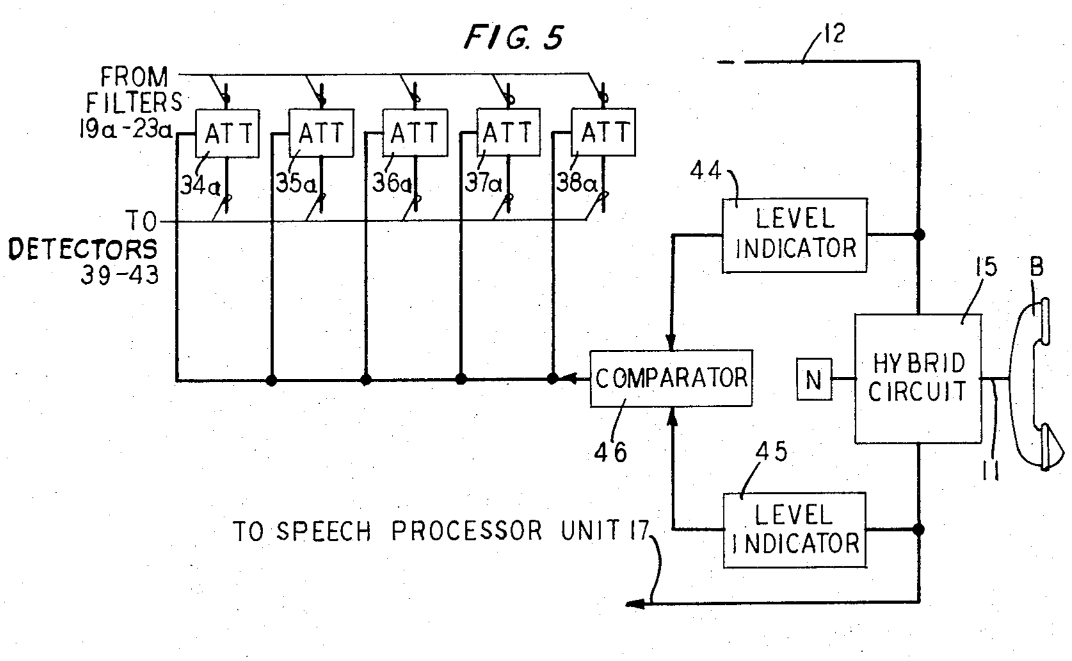
FIG. 5 is a schematic block diagram showing variable adjustment of the attenuation levels for each subband.

Accordingly pursuant to a further aspect of the invention, variable level attenuators designated **34*a*–38*a*** are used, and an adaptive setting of the attenuators is provided as shown in FIG. 5.

In response to some initiating condition occurring during a no-talk interval from the near-end, such as a plurality of tones from a source not shown, and corresponding in center frequency to the center frequencies of the filters 19–23 are sent, for example, one at a time along the path 12. Each tone before entering hybrid 15 is shunted to a level indicator 44 which detects the tone's level. In going through hybrid 15, the tone undergoes a trans-hybrid loss. The tone as attenuated by hybrid 15 is again measured for level by a second level indicator 45. The input level versus output level for each separate tone then is calculated in a comparator 46. The latter then provides a signal to the corresponding variable attenuators **34*a*–38*a* representative of the specific trans-hybrid loss for each of the subbands in question. Each attenuator 34*a*–38*a*** then is set to reduce the signal it receives so as to match the trans-hybrid loss then occurring in that band.

In a further variation of the foregoing, comparator 46 advantageously may be adapted to supply relatively crude indicia of trans-hybrid loss occurring in the respective subbands, as by providing output signals that respond to four or so discrete levels, such as 6 dB, 12 dB, 18 dB, and 24 dB of trans-hybrid loss.

Figure 6:
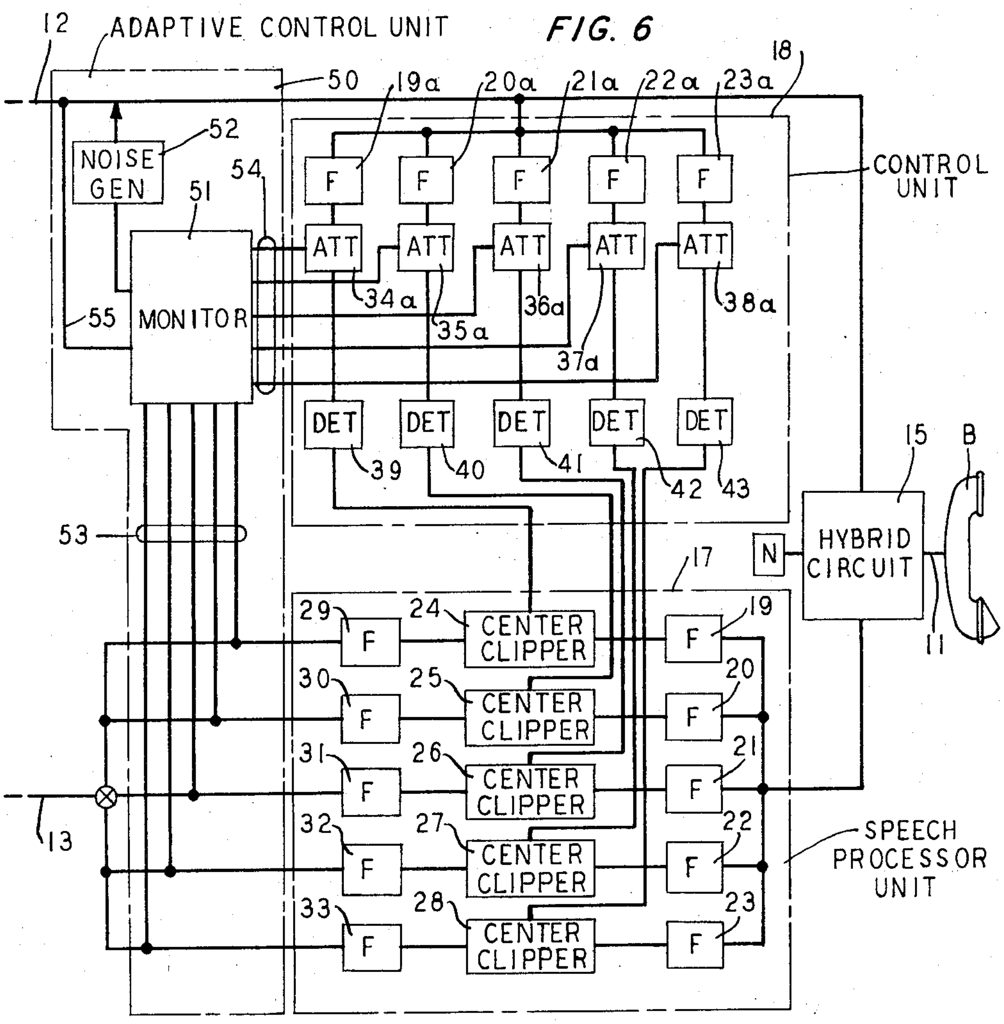
FIG. 6 is a schematic block diagram showing an alternate attenuation level adjustment method.

Adaptive setting of attenuators **34*a*–38*a* may alternatively be achieved by the scheme depicted in FIG. 6. The adaptive control unit, denoted 50, comprises a monitor 51 and a white noise generator 52. Plural connections 53 to monitor 51 from the respective outputs of filters 29–33, and a corresponding number of connections 54 from monitor 51 to variable attenuators 34*a*–38*a* are provided. Generator 52 is connected between monitor 51 and transmission path 12; and a sensing line 55 is connected between the latter and monitor 51**.

In the absence of near-end talking and in response to some initiating condition such as the completion of a connection between station B and a remote station, monitor 51 energizes white noise generator 52. The latter applies to transmission path 12 a signal having substantial spectral components in the subbands of filters 19–23 and **19*a*–23*a*. The signal undergoes a loss across hybrid 15 and thereafter is divided into subbands. In the absence of clipping, the signals appearing at output filters 29–33, or exiting from center clippers 24–28, represent the echo level in each subband. Through the connections 53, these signals are each forwarded to monitor 51. The latter senses the presence of each signal and in response commences to adjust the level of attenuation occurring in the corresponding one of variable attenuators 34*a*–38*a*. This process alters the signal peaks in detectors 39–43** and, hence, also the corresponding clipping levels.

When the clipping levels are set sufficiently high in each subband so that the white noise echo is eliminated, monitor 51 senses the absence of signal input at the several input connections 53, and freezes the attenuation levels in each subband at that point. Thereafter, monitor 51 deenergizes generator 52. The entire sequence may be adapted to occur in well under 1 second. As with the previous embodiment, the attenuation level adjustments may be continuous over the range, or may occur in steps.

The adaptive echo suppressor of the present invention has several advantages. With the frequency spectrum divided into a number of bands, the near-end signal is unaffected in bands where there is no energy in the echo signal. This situation can readily occur when a male with a bass voice is talking to a woman with a high-pitched voice. Furthermore, the echo is completely removed in bands where there is no near-end signal component present. Break-in of the near-end talker can occur without a double-talking decision even for a return loss approaching 0 dB. The echo is not discernible even during double-talking, and speech mutilation is not significant.

The multiband controlled center-clipping processor of the present invention can also be used to avoid echo and achieve feedback stability without resort to voice switching as, for example, in some hands-free telephony situations.

Figure 7:
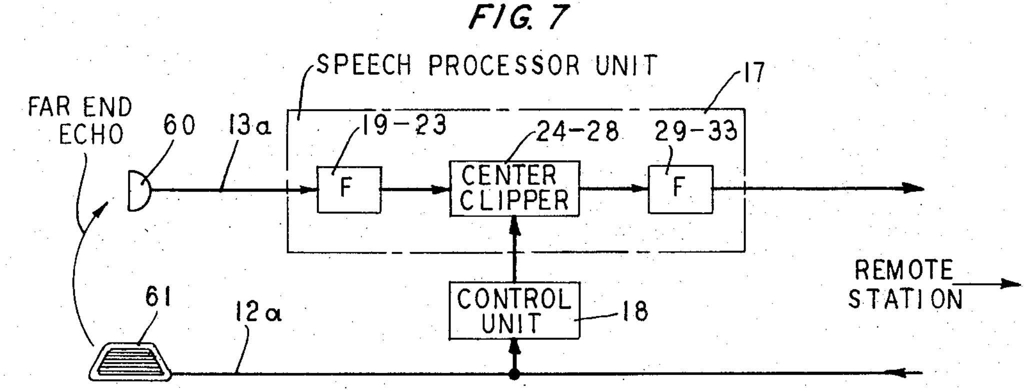
FIGS. 7–9 are schematic block diagrams disclosing use of the invention in hands-free telephony.

The configuration shown in FIG. 7 depicts use of the present invention in a four-wire speakerphone in which a microphone 60 is connected to a two-wire transmit path 12a, and the associated loudspeaker 61 is connected to a separate receive path 13*a*. Far-end talker echo, i.e., the signal returned to the far-end speaker as echo, is caused by the coupling through room acoustics between speaker 61 and microphone 60. This echo can be suppressed with the system that includes control unit 18 and processor 17, which function as already described with respect to FIG. 1.

In a two-wire speakerphone, near-end talker echo, i.e., that portion of the outgoing signal which leaks across the near-end hybrid, is present in addition to the far-end talker echo mentioned above.

Figure 8:
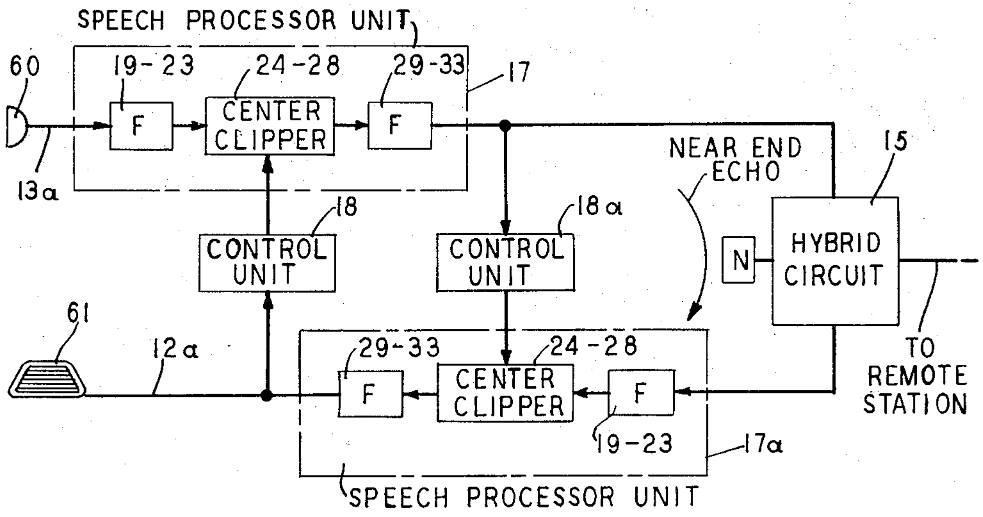

The far-end and near-end echoes are both suppressed with the inventive embodiment depicted in FIG. 8. Far-end coupling across the acoustic path is suppressed by the control unit 18 and processor 17. Near-end echo is suppressed by the control unit 18*a* and processor 17*a*.

Figure 9:
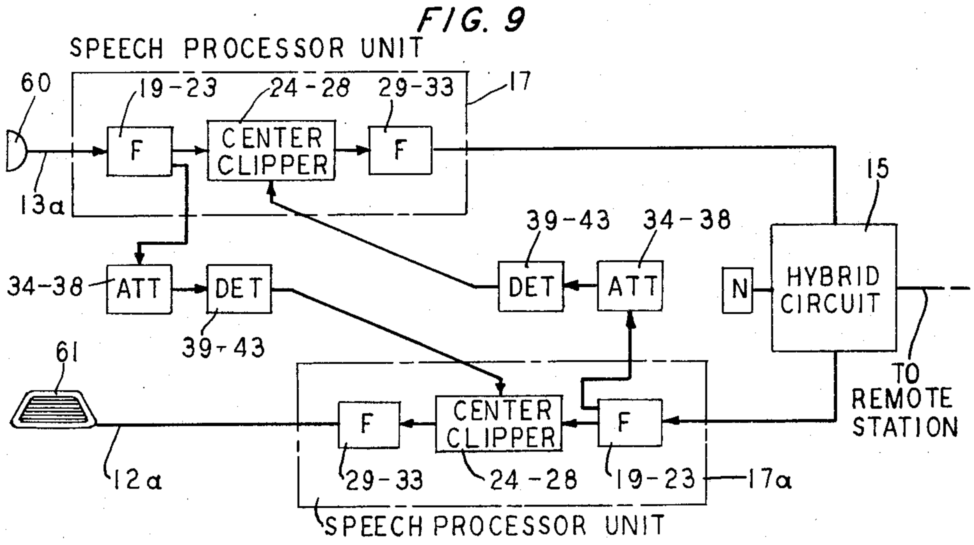

A simplification of the FIG. 8 embodiment is depicted in FIG. 9. Here, advantage is made of the fact that the control filters 19*a*–*23a*, normally part of unit 18 and 18*a*, may be eliminated by tapping the same subbanded signal directly from processor filters 19–23 in processors 17 and 17*a*.

It is to be understood that the embodiments described herein are merely illustrative of the principles of the invention. Various modifications may be made thereto by persons skilled in the art without departing from the spirit and scope of the invention.

What is claimed is:

1. For a voice communications system containing imperfectly isolated transmit and receive paths, apparatus for reducing echo caused by leakage therebetween, comprising:
   - means for dividing the transmit path signal into plural contiguous subbands,
   - means for producing, from an incoming voice signal in the receive path, a replica of the echo of said voice signal occurring in each of said transmit path subbands,
   - means for continuously detecting the peak level of each said echo replica,
   - means for center-clipping the signal in each transmit path subband a varying amount in response to the concurrent said peak level value, sufficient to just overcome said echo in the respective subband, and
   - means for combining the outputs of each center-clipping means for transmission.

2. Apparatus pursuant to claim 1, wherein said dividing means comprises a first set of contiguous band filters; and wherein said echo replica-producing means comprises a second set of contiguous band filters spanning the same subbands as said first set and being connected across said receive path, an attenuator connected to the output of each filter in said second set, and means for setting each attenuation level to obtain an output from each said attenuator having an amplitude comparable to said echo signal occurring in the corresponding transmit path subband.

3. Apparatus pursuant to claim 2, wherein said attenuation levels are fixed.

4. Apparatus pursuant to claim 2, further comprising means for varying said attenuation levels, comprising:
   - a white noise generator connected to said receive path,
   - means responsive to a selected initiating circuit condition for energizing said generator,
   - means for sensing the resulting echo signal level exiting from said center-clippers in each of said transmit path subbands, and
   - means responsive to each said sensed level for adjusting the corresponding attenuator until no echo signal is sensed, and thereafter, for deenergizing said generator.

5. Apparatus pursuant to claim 2, wherein said center-clipping means includes means for returning said clipping levels to zero a prescribed time after disappearance of an echo signal in that subband.

6. Apparatus pursuant to claim 2, wherein said center-clipping means includes means for returning said clipping levels to a selected minimum value.

* * * * *